(12) United States Patent
McQuain

(10) Patent No.: US 7,315,839 B2
(45) Date of Patent: Jan. 1, 2008

(54) SECURITIES PRICING SYSTEM

(75) Inventor: Barry McQuain, London (GB)

(73) Assignee: UBS AG, Zurich (CH)

( * ) Notice: Subject to any disclaimer, the term of this patent is extended or adjusted under 35 U.S.C. 154(b) by 1252 days.

(21) Appl. No.: 09/961,026

(22) Filed: Sep. 20, 2001

(65) Prior Publication Data
US 2003/0055775 A1 Mar. 20, 2003

(51) Int. Cl.
*G06Q 40/00* (2006.01)
(52) U.S. Cl. .............................. 705/37; 705/35; 705/36
(58) Field of Classification Search ................... 705/37
See application file for complete search history.

(56) References Cited

U.S. PATENT DOCUMENTS

| | | | | |
|---|---|---|---|---|
| 3,716,835 A | * | 2/1973 | Weinberg et al. ...... | 340/825.27 |
| 4,473,824 A | * | 9/1984 | Claytor ................. | 340/825.27 |
| 4,674,044 A | * | 6/1987 | Kalmus et al. ............... | 705/37 |
| 2003/0009412 A1 | * | 1/2003 | Furbush et al. ............... | 705/37 |
| 2003/0009413 A1 | * | 1/2003 | Furbush et al. ............... | 705/37 |
| 2003/0009414 A1 | * | 1/2003 | Furbush et al. ............... | 705/37 |

OTHER PUBLICATIONS

Ananth Madhavan, "Trading Mechanisms in Securities Markets," The Journal of Finance, vol. 47, No. 2. (Jun. 1992), pp. 607-641.*
Mark D. Flood et al., "Quote Disclosure and Price Discovery in Multiple-Dealer Finacial Markets," The Review of Financial Studies, vol. 12, No. 1. (Spring, 1999), pp. 37-59.*

* cited by examiner

*Primary Examiner*—Jagdish Patel
*Assistant Examiner*—Sara Chandler
(74) *Attorney, Agent, or Firm*—Gottlieb, Rackman & Reisman, PC

(57) ABSTRACT

A system for adjusting a price for a security, the price having a spread, and including a pricing engine for providing to a client a price quote for the security. Also included is a past trades database for storing at least one past trade executed by the client. A price adjustment module in communications with the pricing engine is included for adjusting the spread provided to the client based on the at least one past trade.

33 Claims, 2 Drawing Sheets

SECURITIES PRICING SYSTEM

BACKGROUND

The following invention relates to a system and method for providing a client with a price for a security and, in particular, for a system and method for dynamically adjusting price quotes generated by an automated trading system.

Financial institutions often use automated trading systems to support their clients' trading requests. Generally, these automated trading systems provide the client with price quotes upon which the client may base a trading decision. Such trading systems may provide price quotes for any type of security such as FX securities, equities, commodities and debt instruments. (See, for example, Kalmus et al., "Automated Securities Trading System, U.S. Pat. No. 4,674,044).

Referring now to FIG. 1, there is shown a block diagram of an exemplary prior art trading system 10. Trading system 10, operated by a financial institution, is accessed by a client access device, operated by a client, for receiving price quotes in securities and issuing trade requests in such securities. Trading system 10 includes a pricing engine 14 that calculates a price quote in response to a client price request using known pricing techniques based on real-time market information (for e.g., interest rate information). A responsive price quote may also be provided manually such as directly by a salesperson and/or trader. Upon receiving a price quote, the client may indicate to trading system 10 a desire to trade in the particular security based on the price quote. Trading system 10 also includes a settlement system 15 for implementing the steps required to credit the requested trade to the client's account and a hedging module 16 that interfaces with external markets for eliminating any risk to the financial institution as a result of accepting the trade.

Financial institutions typically take into consideration the type and size of the client when providing the client with a price quote. For example, the financial institution may quote better prices to those clients that provide the financial institution with a larger amount of trading business. To provide this price differentiation in the context of an automated trading system, some prior art pricing engines provide a client with price quotes from one of a discrete number of pricing levels. The pricing level that is given to a particular client is based on the volume of trading the client has done with the financial institution. So, for example, if a client has provided the financial institution with a significant amount of trading business, that client may placed in a more favorable (to the client) pricing level. Thus, when the client requests a price quote from the trading system, the pricing engine will provide the client with price quotes according to the designated pricing level.

A drawback of the pricing engines of prior art trading systems is that the prices that are provided to clients are either uniform for all clients or are based on a limited number of discrete pricing levels. First, a discrete number of pricing levels is often insufficient and cumbersome for providing tailored price quotes to a large client base. Also, basing price level selection on the particular client's prior trading volume does not always reflect the current value of the client to the financial institution. For instance, other characteristics of the client, such as the client's trading patterns and profits generated, may often be useful as a basis for adjusting pricing. Furthermore, the prior art pricing engines do not dynamically adjust pricing in order to achieve a specific result such as, for example, maximizing profits per customer or increasing overall trading volume.

Accordingly, it is desirable to provide a system and method for dynamically adjusting price quotes generated by an automated trading system.

SUMMARY OF THE INVENTION

The present invention is directed to overcoming the drawbacks of the prior art. Under the present invention a system is provided for adjusting a price for a security, the price having a spread, and including a pricing engine for providing to a client a price quote for the security. Also included is a past trades database for storing at least one past trade executed by the client. A price adjustment module in communications with the pricing engine is included for adjusting the spread provided to the client based on the at least one past trade.

In an exemplary embodiment, a price quote log for storing at least one past price quote received by the client is included wherein the price adjustment module adjusts the spread based on the at least one past price quote.

In another exemplary embodiment, the spread is adjusted in an increment.

In yet another exemplary embodiment, the increment is a multiple of a pip.

In still yet another exemplary embodiment, the price adjustment module receives from the price quote log a number of price quotes the pricing engine has provided the client and a number of trades from the past trade database the client has executed and wherein the price adjustment module causes the spread to be adjusted based on a ratio of the number of trades to the number of price quotes.

In an exemplary embodiment, the price adjustment module causes the spread to be widened by the increment if the ratio is greater than one-half.

In another exemplary embodiment, the price adjustment module causes the spread to be narrowed by the increment if the ratio is less than one-half.

In yet another exemplary embodiment, the price adjustment module receives from the price quote log a number of bid price quotes the pricing engine has provided the client and the price adjustment module receives from the past trade database a number of trades executed at a bid price by the client and wherein the price adjustment module causes the spread to be adjusted based on a ratio of the number of trades executed at a bid price to the number of bid price quotes.

In still yet another exemplary embodiment, the spread has a bid price and wherein the spread is adjusted by adjusting the bid price.

In an exemplary embodiment, the price adjustment module receives from the price quote log a number of ask price quotes the pricing engine has provided the client and the price adjustment module receives from the past trade database a number of trades executed at an ask price by the client and wherein the price adjustment module causes the spread to be adjusted based on a ratio of the number of trades executed at an ask price to the number of ask price quotes.

In another exemplary embodiment, the spread has an ask price and wherein the spread is adjusted by adjusting the ask price.

In yet another exemplary embodiment, the price adjustment module receives from the price quote log a number of ask price quotes the pricing engine has provided the client and the price adjustment module receives from the past trade database a number of trades executed at an ask price by the client and wherein the price adjustment module causes the spread to be adjusted based on a ratio of the number of trades executed at an ask price to the number of ask price quotes.

In still yet another exemplary embodiment, the spread has an ask price and the ratio of the number of trades executed at a bid price to the number of bid price quotes is less than the ratio of the number of trades executed at an ask price to the number of ask price quotes and wherein the spread is adjusted by increasing the ask price.

In an exemplary embodiment, the spread has a bid price and the ratio of said number of trades executed at a bid price to the number of bid price quotes is less than the ratio of the number of trades executed at an ask price to the number of ask price quotes and wherein the spread is adjusted by increasing the bid price.

In another exemplary embodiment, the spread has an bid price and the ratio of the number of trades executed at a bid price to the number of bid price quotes is greater than the ratio of the number of trades executed at an ask price to the number of ask price quotes and wherein the spread is adjusted by increasing the bid price.

In another exemplary embodiment, the spread has a ask price and the ratio of the number of trades executed at a bid price to the number of bid price quotes is greater than the ratio of the number of trades executed at an ask price to the number of ask price quotes and wherein the spread is adjusted by increasing the ask price.

In yet another exemplary embodiment, the pricing engine provides price quotes to a plurality of clients and wherein the price adjustment module causes the spread provided to a randomly selected one of the plurality of client to be widened.

Under the present invention, a method is provided for adjusting a price for a security provided to a client, the price having a spread, and includes the step of storing at least one past trade executed by the client. Next, the spread based on the at least one past trade is adjusted.

In an exemplary embodiment, the method includes the steps of storing at least one past price quote received by the client and adjusting the spread based on the at least one past price quote.

In another exemplary embodiment, the method includes the step of adjusting said spread by an increment.

In yet another exemplary embodiment, the method includes the steps of receiving a number of price quotes provided to the client, receiving a number of trades the client has executed and adjusting the spread based on a ratio of the number of trades to the number of price quotes.

In still yet another exemplary embodiment, the method includes the step of widening the spread by the increment if the ratio is greater than one-half.

In an exemplary embodiment, the method includes the step of narrowing the spread by the increment if the ratio is less than one-half.

In another exemplary embodiment, the method includes the steps of receiving a number of bid price quotes provided to the client, receiving a number of trades executed at a bid price by the client and adjusting the spread based on a ratio of the number of trades executed at a bid price to the number of bid price quotes.

In yet another exemplary embodiment, the method includes the step of adjusting the bid price.

In still yet another exemplary embodiment, the method includes the steps of receiving a number of ask price quotes provided to the client, receiving a number of trades executed at an ask price by the client and adjusting the spread based on a ratio of the number of trades executed at an ask price to the number of ask price quotes.

In an exemplary embodiment, the method includes the step of adjusting the ask price.

In another exemplary embodiment, the method includes the steps of receiving a number of ask price quotes provided to the client, receiving a number of trades executed at an ask price by the client, and adjusting the spread based on a ratio of the number of trades executed at an ask price to the number of ask price quotes.

In yet another exemplary embodiment, the spread has an ask price and the ratio of the number of trades executed at a bid price to the number of bid price quotes is less than the ratio of the number of trades executed at an ask price to the number of ask price quotes and wherein the step of adjusting said spread based on a ratio of the number of trades executed at an ask price to the number of ask price quotes includes the step of increasing the ask price.

In still yet another exemplary embodiment, the spread has a bid price and the ratio of the number of trades executed at a bid price to the number of bid price quotes is less than the ratio of the number of trades executed at an ask price to the number of ask price quotes and wherein the step of adjusting the spread based on a ratio of the number of trades executed at an ask price to the number of ask price quotes includes the step of increasing the bid price.

In an exemplary embodiment, the spread has a bid price and the ratio of the number of trades executed at a bid price to the number of bid price quotes is greater than the ratio of the number of trades executed at an ask price to said number of ask price quotes and wherein the step of adjusting the spread based on a ratio of the number of trades executed at an ask price to the number of ask price quotes includes the step of increasing the bid price.

In another exemplary embodiment, the spread has a ask price and the ratio of the number of trades executed at a bid price to the number of bid price quotes is greater than said ratio of the number of trades executed at an ask price to the number of ask price quotes and wherein the step of adjusting the spread based on a ratio of the number of trades executed at an ask price to the number of ask price quotes includes the step of increasing the ask price.

In yet another exemplary embodiment, the method includes the steps of providing price quotes to a plurality of clients and widening the spread provided to a randomly selected one of the plurality of client.

Accordingly, a method and system is provided for dynamically adjusting price quotes generated by an automated trading system.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
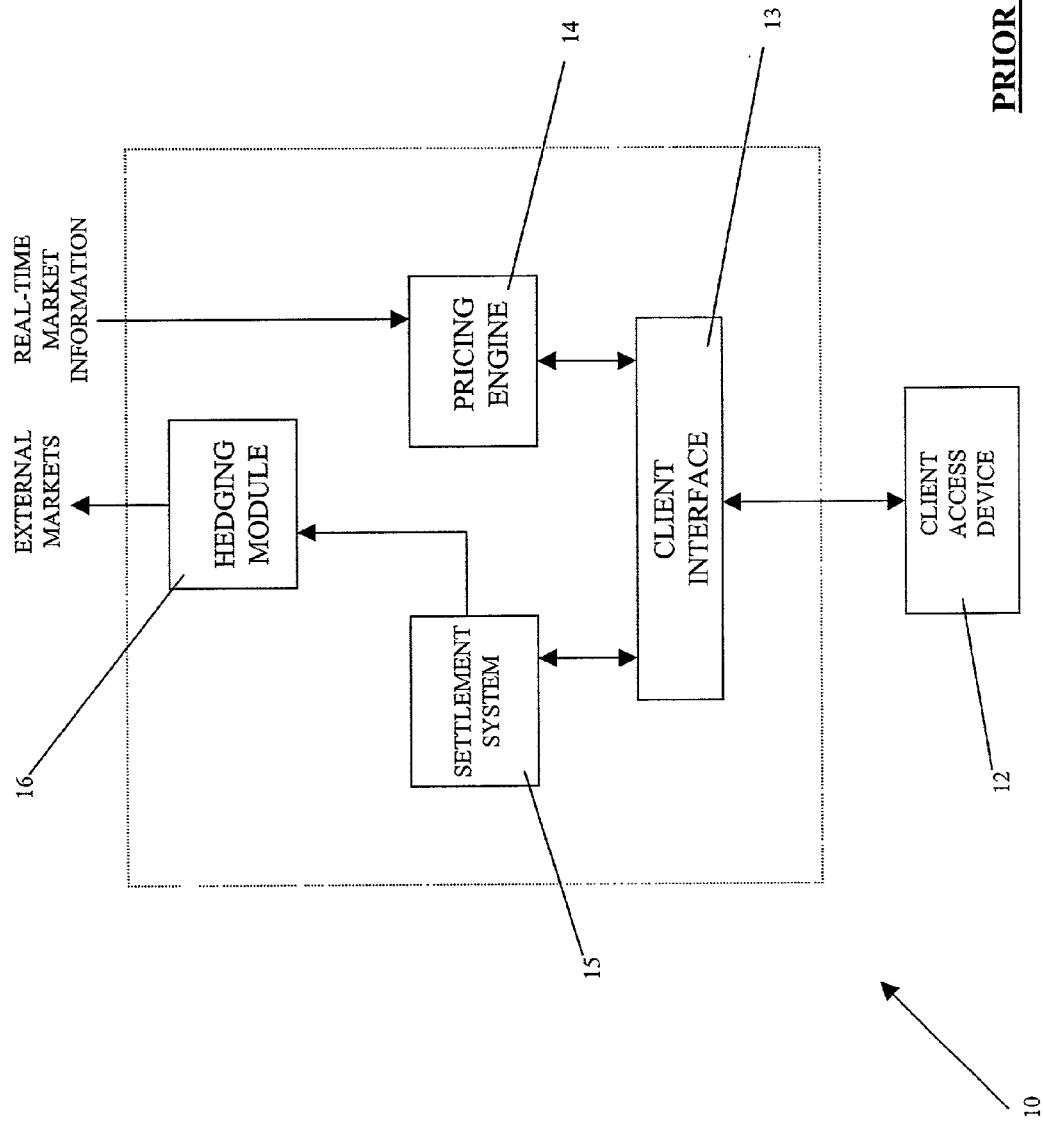
FIG. 1 is a block diagram of an exemplary prior art trading system.
Figure 2:
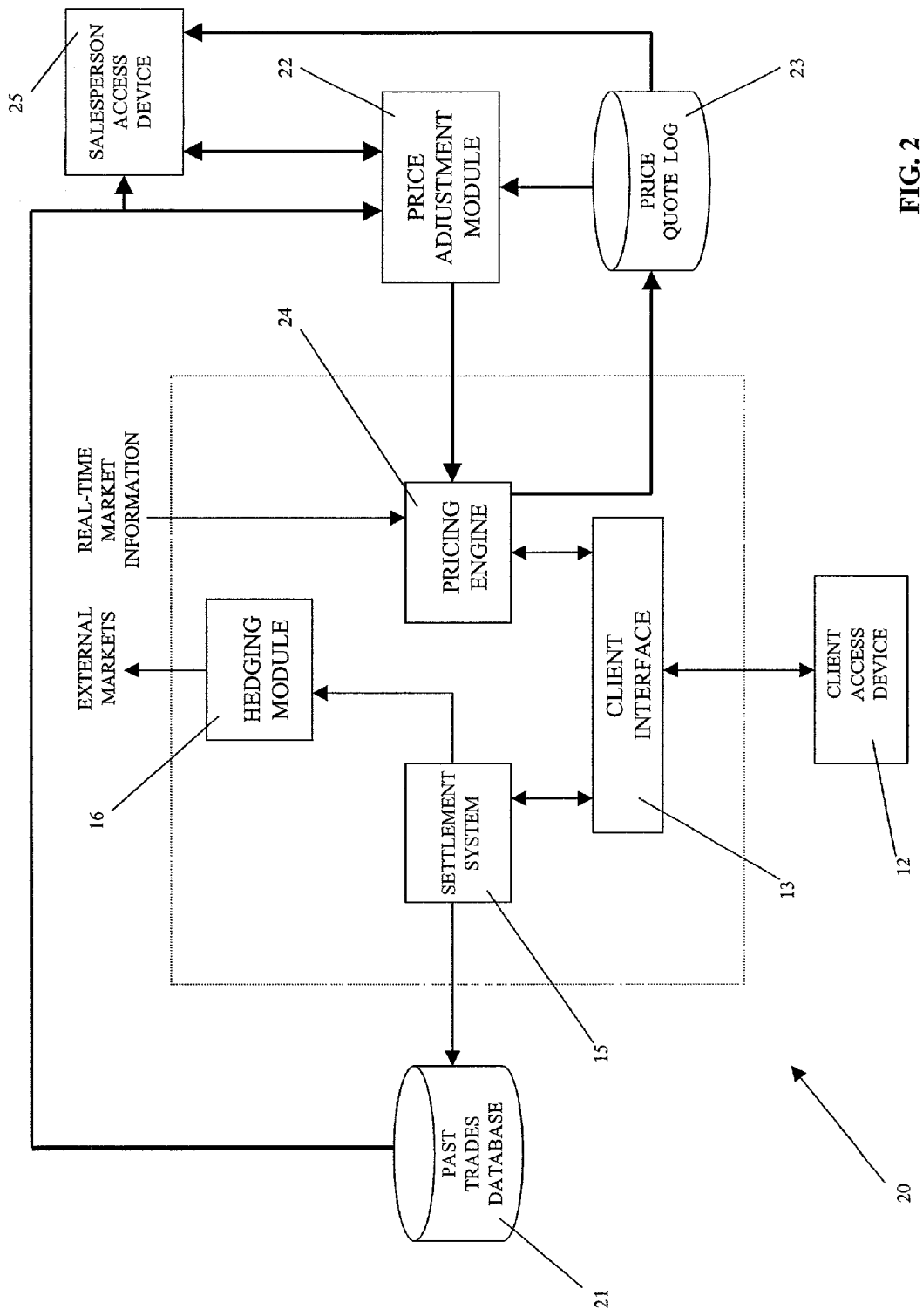
FIG. 2 is a block diagram of a trading system in which price quotes are dynamically adjusted in accordance with the present invention.

Referring now to FIG. 2, there is shown a block diagram of a trading system 20 in which price quotes are dynamically adjusted in accordance with the present invention. Elements that are similar to elements included in trading system 10 of FIG. 1 are identically labeled and a detailed description thereof is omitted.

Trading system 20 includes a past trades database 21 that stores all the past trades executed by each client through trading system 20. In an exemplary embodiment, past trades database 21 is in communications with settlement system 15 and receives from settlement system 15 each trade that was executed via trading system 20. Alternatively, past trades database 21 may receive past trade information from any other source that monitors all trading activity including from any other component within trading system 20. Past trades database 21 may store any information pertaining to a trade executed through trading system 20 including, by way of non-limiting example, the name of the client executing the trade, the time of the trade, the security type, the type of trade (buy/sell), the price and the amount of units/shares traded and the internal transfer price at the time of the trade.

Also included in trading system 20 is a price quote log 23 that stores all price quotes previously provided to each client by pricing engine 24 of trading system 20. In an exemplary embodiment, price quote log 23 is in communications with pricing engine 24 and receives from pricing engine 24 each price quote provided. Price quote log 23 may store any information pertaining to a quote provided by pricing engine 24 including, by way of non-limiting example, the client name requesting the quote, the security type, the bid/ask spread, the time of the price quote, the amount of shares/units for which a price was requested, whether the request was for a one-way or two-way quote, whether a trade was executed based on that price quote and what the internal transfer price was at the time of the price quote.

Trading system 20 also includes a price adjustment module 22 that dynamically adjusts the price quotes provided by pricing engine 24 based on the past trade information received from past trades database 21 and the previous price quotes received from price quote log 23. Price adjustment module may adjust price quotes based on any client characteristic that may be derived from the information stored in past trades database 21 and price request log 23 such as, by way of non-limiting example, the profits to the financial institution as a result of the particular client's trading activity, the client's trading volume, the percentage of trades the client does relative to the number of price requests the client receives from system 20 and the type of products for which the client requests price quotes and executes trades. In addition, price adjustment module 22 may adjust price quotes provided by pricing engine 24 to achieve any desired objective such as, by way of non-limiting example, increase trading volume per client and increase trading profit per client (where profit is calculated, for example, as the difference between the trade price and the internal transfer price at the time of the trade).

For example, if, based on a particular client's past trades stored in past trades database 3 21, price adjustment module 22 determines that the client primarily trades EUR currencies and trades in CHF currencies infrequently, price adjustment module 22 then directs pricing engine 24 to widen the pricing spread for quotes in CHF currency trades given to the client by an increment so that the financial institution increases its overall profits for those lower volume trades. Alternatively, price adjustment module 22 directs pricing engine 24 to narrow the spread for quote in CHF currency trades given to the client by an increment in an attempt to increase the volume of CHF currency trades the client performs.

The increment by which price adjustment module 22 directs pricing engine 24 to adjust pricing may be any suitable increment including, by way of non-limiting example, a multiple of a pip (one ten-thousandth of a unit).

In an exemplary embodiment, price adjustment module 22 tracks the number of trades a particular client performs as a percentage of the number of price quotes the client requests from system 20. If price adjustment module 22 determines that the client has requested a large number of quotes for a particular security but has executed relatively few trades, price adjustment module 22 may direct pricing engine 24 to narrow the spread in quotes provided to the client for that security by an increment in order to increase the volume of trades performed by the client in that security. For example, if the number of trades the client has executed is less than fifty-percent of the number of price requests the client has received, then price adjustment module 22 causes future price quotes provided to the client by pricing engine 24 to be narrowed by an increment.

In an exemplary embodiment, if price adjustment module 22 determines that a particular client executes a large percentage of trades for which the client requests a price quote but that the profits to the financial institution for such trades are low, then price adjustment module 22 directs pricing engine 24 to widen the spread for quotes provided to the client in order to increase the overall profit to the financial institution generated by such client's trades. For example, if the number of trades the client has executed is greater than fifty-percent of the number of price requests the client has received, then price adjustment module 22 causes future price quotes provided to the client by pricing engine 24 to be widened by an increment. If after the spread is widened the client trading volume drops but the profit to the financial institution either remains the same or increases, then price adjustment module 22 may not adjust any further the price quotes provided by pricing engine 24 to the client. If, on the other hand, the trading volume drops and the profits drop for the client, price adjustment module 22 may direct pricing engine 24 to further widen the spread of price quote provided to the particular client in order to increase profits.

In an exemplary embodiment, price adjustment module 22 tracks the number of price quotes the client has requested on the bid and on the ask and also determines how many of these price requests have resulted in trades. If, for example, price adjustment module 22 determines that the client executes trades for five-percent of all price quotes received on the bid but executes trades for ninety-percent of all price quotes received on the ask, then price adjustment engine 22 may direct pricing engine 24 to skew price quotes provided to the client by increasing the ask price by an increment. In this way, the financial institution can maximize the profits it generates form the client's propensity for trading at the ask. Alternatively, price adjustment engine 22 may direct pricing engine 24 to skew price quotes provided to the client by increasing the bid price by an increment in order to exact a premium on the client for trading on an infrequent side.

In an exemplary embodiment, price adjustment module 22 directs pricing engine 23 to widen the spread of price quotes provided to a randomly selected client by an increment. Price adjustment module 22 then tracks the trading volume and profits generated by the trades of the randomly selected to determine that the spread widening has had a desirable affect on profits and/or volume.

In an exemplary embodiment, trading system 20 includes a salesperson access device 25 (for e.g., a personal computer operating suitable software) that interfaces with price adjustment module 22, past trades database 21 and price quote log 23 for enabling a salesperson to track the price adjustments provided by price adjustment module 22 to the clients of the particular salesperson. In addition, the salesperson may use access device 25 to view the pricing rules applied by price adjustment module 22 in any particular instance and adjust the pricing rules accordingly The salesperson may also use access device 25 to access past trade database 21 and view client trading activity by currency or any other desired parameter as well as to access price quote log 23 to view the number of price requests provided to the clients. In addition, access device 25 may include software to calculate any desired result including, by way of non-limiting example, the percentage of trades per price quotes provided for different periods of time. Also, a salesperson operating access device 25 may receive an automatic message notification each time one of the salesperson's clients trade, the spreads the clients is quoted by pricing engine 24, the price adjustments made by price adjustment module 22 to the price quotes as well as any other piece of information desired by the salesperson.

Accordingly, a system and method is provided for dynamically adjusting price quotes generated by an automated trading system in order to achieve a desired objective such as, for example, increased profits per client. While a number of scenarios in which price adjustment module 22 adjusts price quotes generated by pricing engine 24 have been discussed, it will be obvious based on the above to incorporate into price adjustment module 22 any other price adjustment rules suitable for any other type of situation for the purpose of tuning pricing engine 24 in order to achieve any desired objective.

A number of embodiments of the present invention have been described. Nevertheless, it will be understood that various modifications may be made without departing from the spirit and scope of the invention. Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. Network access devices 203-205 can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A system for providing to a particular client of a financial institution a price spread for a security that is tailored to the past trading activity of that particular client, the price spread being the difference between a bid price and an ask price, comprising:
   a pricing engine for providing to clients of the financial institution price quotes for securities, wherein a price quote comprises a bid price and an ask price which together determine the price spread for each security,
   a past trades database for storing information regarding past trades executed clients of the financial institution,
   a price quote log for storing information regarding past price quotes provided to client of the financial institution, and
   a price adjustment module in communication with said pricing engine for adjusting the price spread for the security provided to said particular client based on (1) information stored in said past trades database regarding past trades of that particular client comprising the number of that client's trades, (2) information stored in said past trades of that information stored in said price quote log regarding price quotes provided in the past to that particular client, and (3) relationship among information regarding the number of trades of that particular client stored in said past trades database and said price quote log regarding said particular client in addition to any adjusting of the price spread for the security that is made uniformly for clients of said financial institution based on all of the information stored in said past trades database and said price quote log.

2. A system for providing to a particular client of a financial institution a price spread for a security that is tailored to the past trading activity of that particular client in accordance with claim 1 wherein adjustments to the price spread of a security price are made in increments.

3. A system for providing to a particular client of a financial institution a price spread for a security that is tailored to the past trading activity of that particular client in accordance with claim 2 wherein an increment is a multiple of a pip.

4. A system for providing to a particular client of a financial institution a price spread for a security that is tailored to the past trading activity of that particular client in accordance with claim 3 wherein said price adjustment module receives from said price quote log a number of price quotes said pricing engine has provided the client and receives from said past trades database a number of trades the client has executed, and wherein said price adjustment module causes said price spread to be adjusted based on a ratio of said number of trades to said number of price quotes.

5. A system for providing to a particular client of a financial institution a price spread for a security that is tailored to the past trading activity of that particular client in accordance with claim 4 wherein if said ratio is greater than one-half, said price adjustment module causes said price spread to be widened by an increment.

6. A system for providing to a particular client of a financial institution a price spread for a security that is tailored to the past trading activity of that particular client in accordance with claim 4 wherein if said ratio is less than one-half, said price adjustment module causes said price spread to be narrowed by an increment.

7. A system for providing to a particular client of a financial institution a price spread for a security that is tailored to the past trading activity of that particular client in accordance with claim 1 wherein said price adjustment module receives from said price quote log a number of bid price quotes that said pricing engine provided to the client and said price adjustment module receives from said past trades database a number of trades executed at a bid price by the client, and wherein said price adjustment module causes adjustment of said price spread based on a ratio of said number of trades executed at a bid price to said number of bid price quotes.

8. A system for providing to a particular client of a financial institution a price spread for a security that is tailored to the past trading activity of that particular client in accordance with claim 7 wherein said price spread is adjusted by adjusting said bid price.

9. A system for providing to a particular client of a financial institution a price spread for a security that is tailored to the past trading activity of that particular client in accordance with claim 1 wherein said price adjustment module receives from said price quote log a number of ask price quotes that said pricing engine provided to the client and said price adjustment module receives from said past trades database a number of trades executed at an ask price by the client, and wherein said price adjustment module causes adjustment of said price spread based on a ratio of said number of trades executed at an ask price to said number of ask price quotes.

10. A system for providing to a particular client of a financial institution a price spread for a security that is tailored to the past trading activity of that particular client in accordance with claim 1 wherein said price spread is adjusted by adjusting said ask price.

11. A system for providing to a particular client of a financial institution a price spread for a security that is tailored to the past trading activity of that particular client in accordance with claim 1 wherein if the ratio of the number of trades executed at a bid price to the number of bid price quotes is less than the ratio of the number of trades executed at an ask price to the number of ask price quotes, then the price spread is adjusted by increasing said ask price.

12. A system for providing to a particular client of a financial institution a price spread for a security that is tailored to the past trading activity of that particular client in accordance with claim 1 wherein if the ratio of the number of trades executed at a bid price to the number of bid price quotes is less than the ratio of the number of trades executed at an ask price to the number of ask price quotes, then the price spread is adjusted by increasing said bid price.

13. A system for providing to a particular client of a financial institution a price spread for a security that is tailored to the past trading activity of that particular client in accordance with claim 1 wherein if the ratio of the number of trades executed at a bid price to the number of bid price quotes is greater than the ratio of the number of trades executed at an ask price to the number of ask price quotes, then the price spread is adjusted by increasing said bid price.

14. A system for providing to a particular client of a financial institution a price spread for a security that is tailored to the past trading activity of that particular client in accordance with claim 1 wherein if the ratio of the number of trades executed at a bid price to the number of bid price quotes is greater than the ratio of the number of trades executed at an ask price to the number of ask price quotes, then the spread is adjusted by increased by increasing said ask price.

15. A system for providing to a particular client of a financial institution a price spread for a security that is tailored to the past trading activity of that particular client in accordance with claim 1 wherein said pricing engine provides price quotes to a plurality of clients, and wherein said price adjustment module causes said price spread provided to a randomly selected one of said plurality of clients to be widened.

16. A method for providing to a particular client of a financial institution a price spread for a security that is tailored to the past trading activity of that particular client, the price spread being the difference between a bid price and an ask price, comprising the steps of:
   storing information regarding past trades executed by clients of the financial institution,
   storing information regarding past price quotes previously provided to clients of the financial institution, wherein a price quote comprises a bid price and an ask price which together determine the price spread for each security, and
   adjusting the price spread based on (1) information regarding past trades of said particular client comprising the number of that client's trades, (2) information regarding quotes previously to said particular client, and (3) relationships between the number of trades of that particular client and price quotes provided to said particular client in addition to any adjusting of the price spread for the security that is made uniformly for clients based on past trades of and price quotes previously provided to clients of the financial institution as a whole.

17. A method for providing to a particular client of a financial institution a price spread for a security that is tailored to the past trading activity of that particular client in accordance with claim 16 wherein adjustments to the price spread of a security price are made in increments.

18. A method for providing to a particular client of a financial institution a price spread for a security that is tailored to the past trading activity of that particular client in accordance with claim 17 wherein an increment is a multiple of a pip.

19. A method for providing to a particular client of a financial institution a price spread for a security that is tailored to the past trading activity of that particular client in accordance with claim 16 wherein the price spread is adjusted based on the ratio of a number of trades the client has executed to a number of price quotes provided to the client.

20. A method for providing to a particular client of a financial institution a price spread for a security that is tailored to the past trading activity of that particular client in accordance with claim 19 wherein in said step of adjusting said price spread based on said ratio of a number of trades to a number of price quotes the price spread is widened by an increment if said ratio is greater than one-half.

21. A method for providing to a particular client of a financial institution a price spread for a security that is tailored to the past trading activity of that particular client in accordance with claim 19 wherein in said step of adjusting said price spread based on said ratio of a number of trades to a number of price quotes the price spread is narrowed by an increment if said ratio is less than one-half.

22. A method for providing to a particular client of a financial institution a price spread for a security that is tailored to the past trading activity of that particular client in accordance with claim 16 wherein the price spread is adjusted based on the ratio of a number of trades the client has executed at a bid price to a number of bid price quotes provided to the client.

23. A method for providing to a particular client of a financial institution a price spread for a security that is tailored to the past trading activity of that particular client in accordance with claim 22 wherein the price spread is adjusted by adjusting the bid price.

24. A method for providing to a particular client of a financial institution a price spread for a security that is tailored to the past trading activity of that particular client in accordance with claim 16 wherein the price spread is adjusted based on the ratio of a number of trades the client has executed at an ask price to a number of ask price quotes provided to the client.

25. A method for providing to a particular client of a financial institution a price spread for a security that is tailored to the past trading activity of that particular client in accordance with claim 24 wherein the price spread is adjusted by adjusting the ask price.

26. A method for providing to a particular client of a financial institution a price spread for a security that is tailored to the past trading activity of that particular client in accordance with claim 25 wherein the price spread is widened by an increment if said ratio is greater than one-half.

27. A method for providing to a particular client of a financial institution a price spread for a security that is tailored to the past trading activity of that particular client in accordance with claim 26 wherein the price spread is narrowed by an increment if said ratio is less than one-half.

28. A method for providing to a particular client of a financial institution a price spread for a security that is tailored to the past trading activity of that particular client in accordance with claim 16 wherein if the ratio of a number of trades executed at a bid price by said client to a number of bid price quotes provided to the client is less than the ratio of a number of trades executed by said client at an ask price to a number of ask price quotes provided to the client, then the price spread is adjusted by increasing the bid price.

29. A method for providing to a particular client of a financial institution a price spread for a security that is tailored to the past trading activity of that particular client in accordance with claim 16 wherein if the ratio of a number of trades executed at a bid price by said client to a number of bid price quotes provided to the client is greater than the ratio of a number of trades executed by said client at an ask price to a number of ask price quotes provided to the client, then the price spread is adjusted by increasing the bid price.

30. A method for providing to a particular client of a financial institution a price spread for a security that is tailored to the past trading activity of that particular client in accordance with claim 16 wherein if the ratio of a number of trades executed at an ask price by said client to a number of ask price quotes provided to the client is less than the ratio of a number of trades executed by said client at a bid price to a number of bid price quotes provided to the client, then the price spread is adjusted by increasing the ask price.

31. A method for providing to a particular client of a financial institution a price spread for a security that is tailored to the past trading activity of that particular client in accordance with claim 16 wherein if the ratio of a number of trades executed at an ask price by said client to a number of ask price quotes provided to the client is greater than the ratio of a number of trades executed by said client at a bid price to a number of bid price quotes provided to the client, then the price spread is adjusted by increasing the ask price.

32. A method for providing to a particular client of a financial institution a price spread for a security that is tailored to the past trading activity of that particular client in accordance with claim 16 wherein price quotes are provided to a plurality of clients, and further including the step of causing the price spread provided to a randomly selected one of said plurality of clients to be widened.

33. A method for providing to a particular client of a financial institution a price spread for a security that is tailored to the past trading activity of that particular client in accordance with claim 16 wherein the price spread is adjusted by increasing one of the bid and ask prices based on profits generated from the client as determined from the information stored regarding past trades of the client.

* * * * *